May 24, 1949.   J. I. STEIN   2,471,128
INCANDESCENT ELECTRIC HEATER
Filed Oct. 23, 1945   3 Sheets-Sheet 1
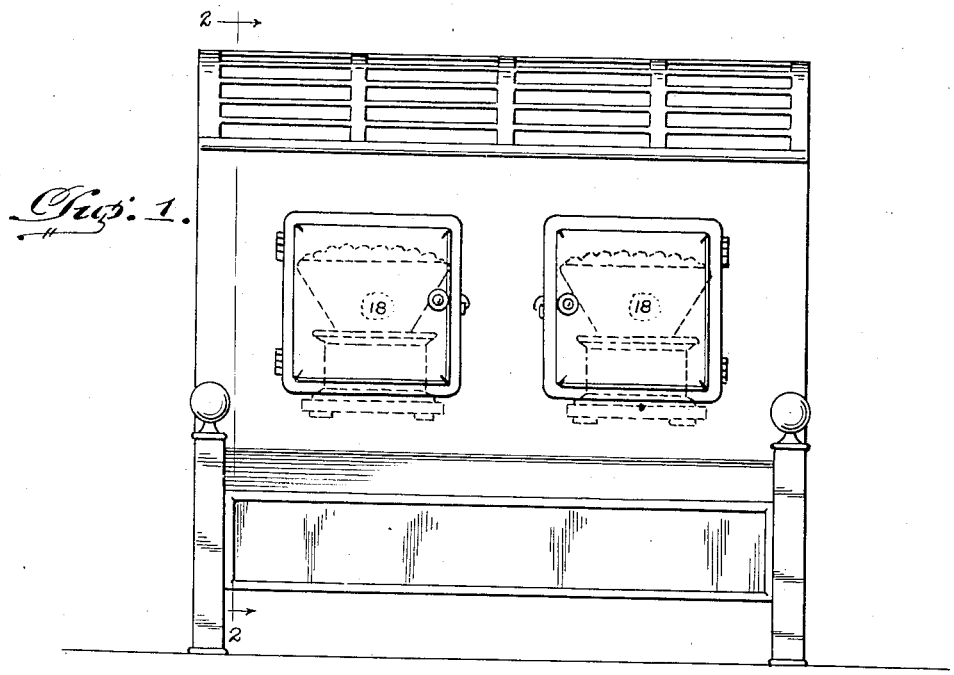
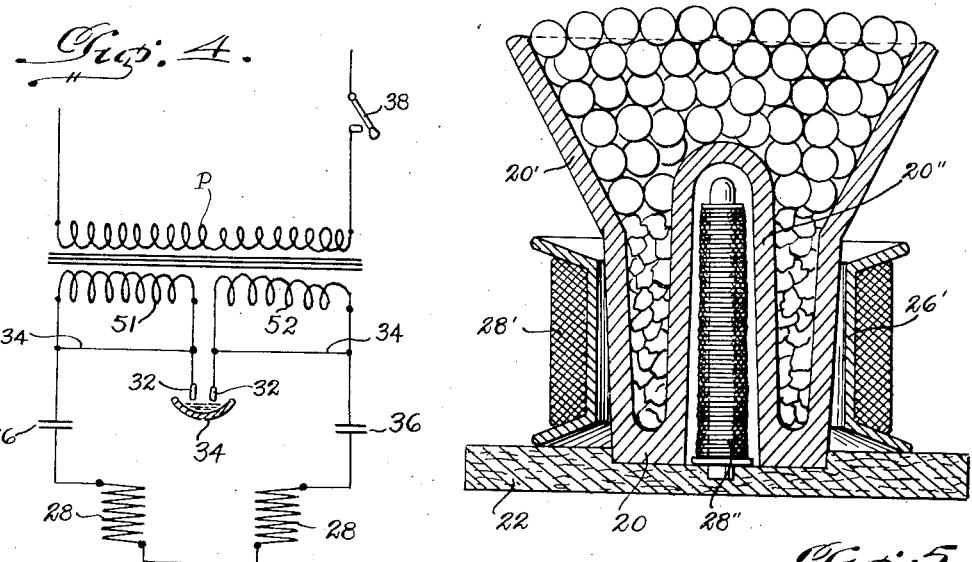
John I. Stein,
INVENTOR.

May 24, 1949. J. I. STEIN 2,471,128
INCANDESCENT ELECTRIC HEATER
Filed Oct. 23, 1945 3 Sheets-Sheet 2

John I. Stein,
INVENTOR.

BY McMorrow, Berman & Davidson
Attorneys

May 24, 1949.  J. I. STEIN  2,471,128
INCANDESCENT ELECTRIC HEATER
Filed Oct. 23, 1945  3 Sheets-Sheet 3

John I. Stein,
INVENTOR.
BY
Attorneys

Patented May 24, 1949

2,471,128

UNITED STATES PATENT OFFICE 2,471,128

INCANDESCENT ELECTRIC HEATER

John I. Stein, Muncie, Ind.

Application October 23, 1945, Serial No. 623,905

2 Claims. (Cl. 219—47)

This invention appertains to electrically-operated space heaters generally and has for an object to provide a heating unit for furnaces, stoves and the like, particularly those for domestic use, which operates economically on high frequency electric current to produce incandescent temperatures in certain materials, associated with the heating unit, that have the property of retaining high heat over comparatively long periods of time, after the bringing of the same to a point of incandescence and the stoppage of the current initially applied to the unit.

Another object of the invention has to do with the provision of a heating unit of this character, wherein balls, briquettes, or chunks of certain materials, or compounds of such materials, hereinafter referred to as "glow briquettes," are placed within a crucible and heated inductively to incandescence; the crucible being emplaced within a magnetic field of a transformer system, or having an electrode incorporated within the same beneath the glow briquettes, for the generation of a high heat by the passage of a high frequency electric current through the transformer system, or through the said electrode.

A further object of the invention lies in the provision of a space heating apparatus, preferably of the domestic type of heating or cooking stove, furnace, or fireplace heater, wherein one or more of the aforesaid heating units are incorporated within the same to replace the usual burner or grate structure and are arranged in electrical connection with a high frequency generator unit which may be conveniently mounted on the outer side of the stove or furnace frame, preferably the rear vertical side thereof, thus making the apparatus self-contained and ready for immediate operation by merely plugging it in on the usual 60 cycle, 110 volt, A.-C. lighting circuit.

With these and other objects and advantages of equal importance in view, the invention resides in the certain new and useful combination, construction, and arrangement of parts and circuits, as will be hereinafter more fully described, set forth in the appended claims, and illustrated in the accompanying drawings, in which:

Figure 1 is a front elevation of a fireplace type of heater embodying two of the heating units, in accordance with the invention;

Figure 4 is a diagrammatical view of the transformer system of the high frequency generator;

Figure 5 is a view similar to that of Figure 3, but showing a modified form of the heating unit;

Figure 2:
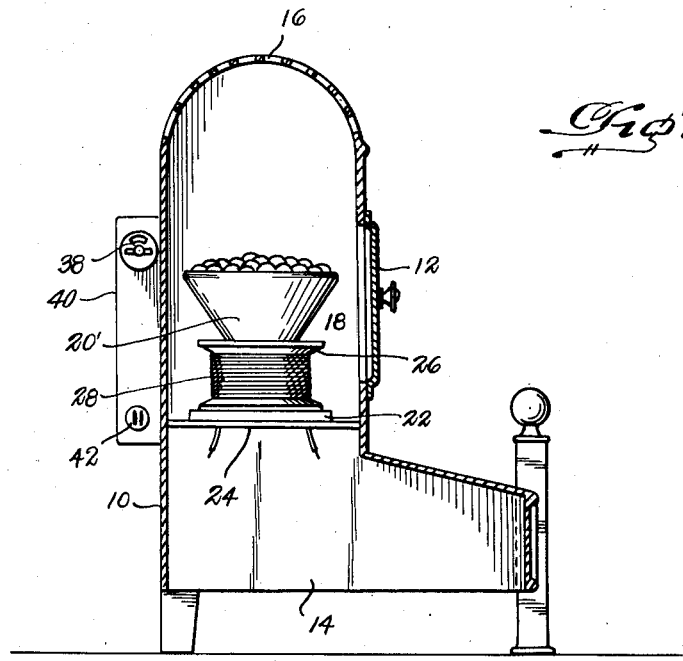
Figure 2 is a vertical, transverse section, taken through the line 2—2 on Figure 1, looking in the direction of the arrows.
Figure 3:
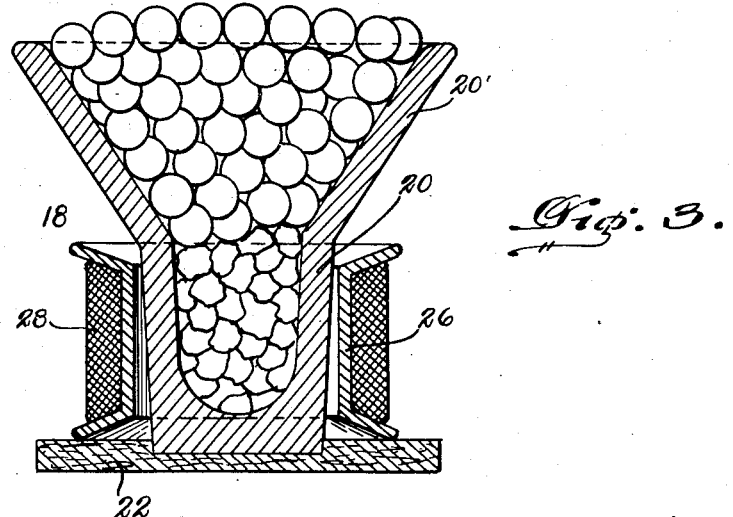
Figure 3 is an enlarged vertical sectional view through one of the heating units per se.

Referring to the drawings, and more particularly to Figures 1 through 4, the invention, as it is exemplified therein, is comprised in a fireplace type of heater casing or frame 10, having a front opening closed by a door 12 for each of the heating units, and an open bottom 14 and a slotted top wall 16, for the circulation of air upwardly therethrough about the heating units, two of the latter being shown and indicated generally at 18 (Figure 1).

Each of the heating units 18, in its simplest form, is comprised in a crucible or pot which is preferably formed with a cylindrical lower part 20 and an open flared top part 20', substantially as shown, and seated on a base 22, of asbestos or other similar heat insulating material, which, in turn, is mounted on suitable supports 24, extending crosswise of the interior of the casing or frame 10, somewhat below the lower edge of its corresponding opening in the front wall of the latter. The lower part of the crucible or pot 18 is encircled by a heat insulating element 26, of spool-like form, upon which an induction coil 28 is wound; the coil being preferably made of tungsten wire of a suitable gauge, although it may be made of other metals having a high temperature coefficient, such as copper, molybdenum, or tantalum, asbestos coated and cemented with zirconium oxide. The crucible or pot 18 is preferably made of graphite carbon, with its lower part 20 filled with chunks of iron-manganese and its upper part 20' with the glow briquettes, the latter being either coke alone, or compounds of the same, including such materials or substances as fire clay; pipe clay; lava; rock-wool; salt; paper-pulp; sawdust; nut shells; hulls; or, to obtain chemical incandescence, compounds of many different minerals, such as thermit; silicon; manganese; chrome; nickel; germanium; tellurium; radium metallic and its oxides, such as lanthanum oxide, cerium and carbon; thorium oxide, beryllium and carbon; or granulated carbon, Carborundum crystals, graphite, etc. The glow briquettes may be made solid, perforated, or hollow, and, if hollow, the interiors thereof filled with an incandescent material, such as amorphous phosphorous. Also, the glow briquettes may be made spherical or in cube form, and, when hollow, from thallium, Pyrex glass, silica, or as a ceramic product, using a filler of thermit.

With the heating units 18 installed within the stove casing or frame 10, as shown in Figure 1, each of the induction coils 28 is to be electrically connected in on the output side of a high frequency, oscillatory generator, such as is shown in Figure 4, wherein the induction coils are electrically connected in series with each other and across the outer terminals of a pair of sections 51 and 52 of the secondary winding of a high voltage, high amperage, iron core transformer, the primary winding P of which is, in turn, connected across a 110 v. or a 220 v. A.-C. power line. The remaining terminals of the secondary sections 51 and 52 is each connected to an electrode 30, of a mercury spark gap assembly 32, across which each of the coils 28 is shunted, as at 34, with a condenser 36 interposed between the same and the shunt connections 34. A switch 38 is provided in the power line to control the application of electrical energy to the primary winding P. The generator unit, thus provided, is encased, as at 40, Figure 2, and is preferably mounted on the back of the stove casing or frame 10, with the switch 38, together with a plug inlet connection 42, mounted exteriorly of the case 40, for convenience in stove installation and operation.

In operation, with the switch 38 closed on the transformer primary P, high frequency current will be impressed on the induction coils 28 and an intense magnetic field will be produced by the magnetization of the iron-manganese filler of the lower part 20, of each of the crucibles or pots, creating an intense heat which will result in bringing the glow briquettes, in the upper part 20′, to an incandescence. At the point of incandescence, the generator may be disconnected from the power line by opening the switch 38, so that heat will be radiated from the stove casing or frame 10 over an appreciable length of time and until the glow briquettes have cooled. Thus, with only an intermittent use of electric power, the stove or furnace, as the case may be, can be operated economically; it having been determined in actual practice that the glow briquettes may be cheaply manufactured, depending upon the materials or substances used in their make-up, and sold in bulk lots after the manner of ordinary fuels. Also, it has been ascertained that the glow briquettes need be replenished on an average of every two days, more or les, dependent upon heating requirements.

In the form of the heating unit shown in Figure 5, the lower cylindrical part 20, of the crucible or pot 18a, is formed with a concentric central portion 20″, of tubular form, closed at its upper end and opening through the bottom of the part 20, to house a secondary winding 28″, in inductive relation with respect to the primary winding 28′, encircled about the insulating element 26′, engaged about the outer side of the part 20. Here, a magnetic field of even a greater intensity is to be had, for the generation of heat within the iron-manganese filler and to raise the glow briquettes to the point of incandescence.

Figure 6:
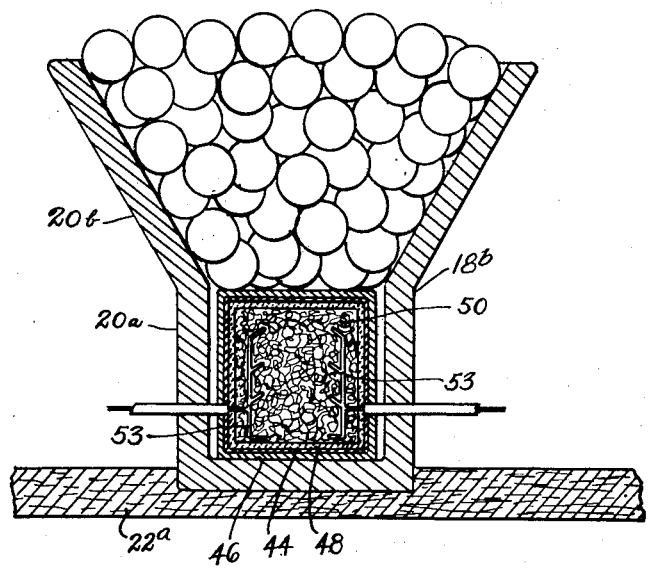
Figure 6 is a view similar to that of Figures 3 and 5, but showing yet another modified form of the heating unit.

Referring now to Figure 6, the modified form of the heating unit shown therein, is embodied in the crucible or pot 18b, having a lower part 20a, either cylindrical or square, and an upper part 20b, open and flared. The crucible or pot 18b is preferably made of carbon and clay and is supported on a heat insulating base 22a, with its upper part filled with the glow briquettes, while its lower part houses an electric heater element, in the form of a hermetically sealed, hollow body 44, preferably made from sheet tungsten, encased with a heat insulating material, such as asbestos cement, indicated at 46, and lined inside with a non-conductor composition, such as silicon and asbestos, indicated at 48. The body or container 44 is filled with tungsten wool, indicated at 50, and houses a pair of opposed, pronged, discharge elements 53. Prior to the sealing of the body or container 44, it is filled additionally with inert nitrogen and argon gas, with neon to be considered for substitution for the argon. After sealing and placing within the lower part 20a, of the crucible or pot 18b, the discharge elements 53 are electrically connected to the opposite terminals of the secondary winding of the transformer, of the high frequency generator, after the manner of the connections of the induction coils 28 with the sections 51 and 52 of said secondary.

Without further description, it is thought to be readily obvious to those familiar with domestic heating appliances and requirements, that the instant invention provides for a highly efficient and economical heat producing medium to replace stoves and furances employing ordinary fuels, the same requiring less attention for its successful operation, producing greater heat at substantially less cost, and operating with greater cleanliness and a minimum of effort or labor.

While in the foregoing I have described my invention in several of its practical embodiments, it is to be understood that the words which I have used are words of description rather than of limitation, and that changes within the purview of the appended claims may be made without departing from the true scope and spirit of my invention in its broader aspects.

What I claim is:

1. An electrically-operated space heater comprising a crucible shaped to provide a substantially cylindrical lower part, and a flared top part having a capacity greater than that of said lower part, a body of material capable of becoming incandescent upon induction heating thereof disposed within the lower part of said crucible, an electric induction coil arranged in surrounding relationship with respect to said lower part for inductively heating said body of material, and means operative to energize said induction coil, said flared top part of said crucible being adapted to hold a charge of fuel briquettes resting upon said body of material in said lower part for transfer of heat from said body of material to said briquettes to thereby heat said briquettes to a temperature such as to produce radiant heat.

2. An electrically-operated space heater comprising a crucible shaped to provide a substantially cylindrical, annular lower part including an annular chamber and having a central recess therein opening to the bottom of said crucible, and a flared top part providing a substantially conical chamber of a capacity greater than said annular, lower chamber, a body of material capable of becoming incandescent upon induction heating thereof disposed in said lower annular chamber, an electric induction coil arranged in surrounding relationship with respect to said lower part of said crucible, an electric induction coil disposed within said central recess in said lower part, for inductively heating said body of material, and means operative to energize said induction coils, said flared top part of said crucible being adapted to hold a charge of fuel briquettes resting upon said body of material in said lower part for transfer of heat from said body of material to said briquettes to thereby heat said briquettes to a temperature such as to produce radiant heat.

JOHN I. STEIN.

REFERENCES CITED

The following references are of record in the file of this patent:

UNITED STATES PATENTS

| Number | Name | Date |
|---|---|---|
| 491,319 | Mitchell | Feb. 7, 1893 |
| 687,505 | Ruthenburg | Nov. 26, 1901 |
| 1,286,395 | Northrup | Dec. 3, 1918 |
| 1,655,983 | Brace | Jan. 10, 1928 |
| 1,775,351 | Linhoff | Sept. 9, 1930 |
| 1,848,716 | Hart et al. | Mar. 8, 1932 |
| 1,892,882 | Gannon et al. | Jan. 3, 1933 |
| 1,937,065 | Moore | Nov. 28, 1933 |
| 1,992,515 | Uhlmann | Feb. 26, 1935 |
| 2,186,718 | Ferguson | Jan. 9, 1940 |
| 2,210,720 | Johnson et al. | Aug. 6, 1940 |

FOREIGN PATENTS

| Number | Country | Date |
|---|---|---|
| 26,865 | Norway | Apr. 17, 1916 |